United States Patent [19]

Ide

[11] Patent Number: 4,468,364
[45] Date of Patent: Aug. 28, 1984

[54] PROCESS FOR EXTRUDING THERMOTROPIC LIQUID CRYSTALLINE POLYMERS

[75] Inventor: Yoshiaki Ide, North Plainfield, N.J.

[73] Assignee: Celanese Corporation, New York, N.Y.

[21] Appl. No.: 489,638

[22] Filed: Apr. 28, 1983

[51] Int. Cl.³ .............................................. B28B 3/20
[52] U.S. Cl. ............................ 264/176 R; 264/176 F
[58] Field of Search ........................ 264/176 F, 176 R

[56] References Cited

U.S. PATENT DOCUMENTS

4,183,895 1/1980 Luise ............................... 264/176 R

Primary Examiner—Jay H. Woo
Attorney, Agent, or Firm—Burns, Doane, Swecker & Mathis

[57] ABSTRACT

Provided is a process for the extrusion of shaped articles which comprises extruding a thermotropic liquid crystal polymer through a short land or preferably no land die, and with subsequent drawdown of the extruded profile being such as to render a drawdown ratio of less than 4, and preferably about 1. Such extrusion of liquid crystal polymers in accordance with the present invention can consistently and reproducibly provide one with an article of high mechanical properties, and thus, particular advantage is found in employing the process to extrude an article of cross-sectional dimensions which must closely approximate those of the extrusion die without sacrificing high mechanical properties.

17 Claims, 6 Drawing Figures

Fig. 4

PROCESS FOR EXTRUDING THERMOTROPIC LIQUID CRYSTALLINE POLYMERS

BACKGROUND OF THE INVENTION

1. Field of the Invention

The present invention relates to a process for the extrusion of liquid crystal polymers to produce shaped articles. More particularly, the present invention relates to an advantageous process for extruding liquid crystal polymers to produce articles having high mechanical properties and cross-sectional dimensions which can closely approximate those of the extrusion die.

2. Description of the Prior Art

In conventional profile extrusion, the dies generally comprise a converging entry region and a land region. While one of the most important aspects of profile extrusion is to control the extrudate profile, it is extremely difficult to control the product profile when extruding conventional flexible polymers since their extrudates do not conform to the die shape. Such incapability of flexible polymers to melt extrude a profile which will accurately correspond to the die shape is due to the elasticity of the polymers and their recoiling upon exiting the die, thereby resulting in extrudate swell. This distortion of extrudate size and shape can generally be reduced by using increased land length and by distorting the profile of the die. For example, in order to extrude a square profile, the die employed in the extrusion of a flexible polymer is generally of a concave configuration around the center. A strictly square die would yield a pillow shaped extrudate.

Thermotropic liquid crystal polymers are known to generally not exhibit elastic recoil when extruded due to their molecular conformation. Thus, melt extruded profiles of liquid crystalline polymers generally tend to conform very closely to die profiles. When forming a melt extruded profile from a liquid crystal polymer, therefore, an extrusion die can be generally selected having a shape which corresponds to the cross-sectional configuration of the profile to be formed, with the exception, however, that the die orifice dimensions are larger than the dimensions of the resulting profile due to a drawdown of the extrudate. Liquid crystal polymer extrudates are generally drawn while in the melt phase immediately adjacent to the extrusion orifice and prior to complete solidification in order to advantageously induce relatively high molecular orientation coextensive with the length of the profile. Such orientation of the polymer molecules contributes to the enhanced mechanical properties of the final product. The extent of such drawdown is influenced by the haul-off speed under which the profile is collected. The resulting drawdown ratio is defined as the ratio of the die cross-sectional area to that of the cross-sectional area of the fully solidified extrudate, which draw ratios (can range between 4 and 100 or more and) are commonly at least 10.

In many instances, however, e.g., in various industrial applications, the dimensions of a product need to be exacting. When such a product is to be extruded, the extrusion process, to be efficient and effective, would thereby need to consistently provide products of the same dimensions. To consistently achieve this result can be very tricky when one has to rely on a distortion of the extruded profile via extrudate swell in order to obtain the properly sized product. Large drawdown of the extruded profile, as in the case of liquid crystal polymers, can also lead to some inconsistencies in the size of the articles produced. In general, any large distortion in the profile dimensions vis-a-vis the extrusion die allows room for inconsistencies. Thus, a process which would consistently yield a product of reproducible dimensions would be of benefit to the art. It is also important, however, that any such extrusion process for attaining the desired consistency and reproducibility in product dimensions does not sacrifice the mechanical properties of the resulting product.

Accordingly, it is an object of the present invention to provide a process for extrusion of shaped articles whereby the dimensions of the extruded article can be consistently reproduced.

It is another object of the present invention to provide a process for the extrusion of shaped articles whereby the articles exhibit high mechanical properties.

Yet another object of the present invention is to provide a process for extruding shaped articles of good mechanical properties whereby the dimensions of the extrudate closely approximate the dimensions of the die orifice.

Still another object of the present invention is to provide a process for extruding liquid crystal polymers to produce articles of good mechanical properties while utilizing minimal drawdown.

Still another object of the present invention is to provide a novel process for extruding liquid crystal polymers of a high viscosity, e.g., a high molecular weight.

Yet another object of the present invention is to provide a process for extruding liquid crystal polymers at higher rates (for a given pressure drop and viscosity) and with little distortion of the profile while attaining good mechanical properties.

Still another object is to provide a process for extruding liquid crystal polymers at higher rates and at lower temperatures (for a given extrusion rate and pressure drop) to thereby result in minimal degradation of the polymers.

These and other objects, as well as the scope, nature and utilization of the claimed invention will be apparent to those skilled in the art from the following detailed description and appended claims.

SUMMARY OF THE INVENTION

In accordance with the foregoing objectives, the present invention provides a process for extruding polymers to form shaped articles which involves minimal distortion of the extruded profile. The process thereby offers one the opportunity to reproducibly obtain articles of the same dimensions, and in particular, obtain articles of dimensions which closely approximate the dimensions of the die orifice. Moreover, these features are achieved without having to sacrifice good mechanical properties. In general, the process comprises extruding a fluid stream of liquid crystal polymer through a converging orifice which has a ratio of land length to die orifice diameter (L/D) in the range of from 0 to about 2, and most preferably 0. Subsequent to extrusion, the extrudate is subjected to minimal drawdown of a ratio less than 4, and then cooled prior to collection.

DESCRIPTION OF THE PREFERRED EMBODIMENTS

The polymers to which the present invention is applicable are thermotropic liquid crystalline polymers which are of a requisite molecular weight to be capable of undergoing melt extrusion. Such thermotropic liquid crystalline polymers are known to the art.

As is known, thermotropic liquid crystalline polymers exhibit optical anisotropy in the melt phase. The anisotropic character of the polymer melt may be confirmed by conventional polarized light techniques whereby crossed-polarizers are utilized. More specifically, the anisotropic nature of the melt phase may conveniently be confirmed by the use of a Leitz polarizing microscope at a magnification of 40X with the sample on a Leitz hot stage and under a nitrogen atmosphere. Although the amount of light transmitted changes when the sample is forced to flow, the sample is optically anisotropic even in the static state. To the contrary, typical melt processable polymers do not transmit light to any substantial degree when examined under identical conditions.

Representative classes of polymers from which the thermotropic liquid crystalline polymers suitable for use in the present invention may be selected include wholly aromatic polyesters, aromatic-aliphatic polyesters, wholly aromatic poly (ester-amides), aromatic-aliphatic poly(ester-amides), aromatic polyazomethines, aromatic polyester-carbonates, and mixtures of the same. In preferred embodiments of the present invention, the thermotropic liquid crystalline polymer employed is a wholly aromatic polyester, a wholly aromatic poly(ester-amide), or an aromatic-aliphatic poly(ester-amide), with the wholly aromatic polyesters being most preferred. In such wholly aromatic polyester and wholly aromatic poly(ester-amide) each moiety present within the polymer chain contributes at least one aromatic ring. Also, it is preferred that naphthalene moieties be included in the thermotropic liquid crystalline polymer, e.g. 6-oxy-2-naphthoyl moiety, 2,6-dioxynaphthalene moiety, or 2,6-dicarboxynaphthalene moiety, most preferably in a concentration of not less than about 10 mole percent. The particularly preferred naphthalene moiety for inclusion in the thermotropic liquid crystalline polymer is the 6-oxy-2-naphthoyl moiety in a concentration of not less than about 10 mole percent.

Representative wholly aromatic polyesters which exhibit thermotropic liquid crystalline properties include those disclosed in the following U.S. Pat. Nos. which are herein incorporated by reference: 3,991,013; 3,991,014; 4,066,620; 4,067,852; 4,075,262; 4,083,829; 4,093,595; 4,118,372; 4,130,545; 4,146,702; 4,153,779; 4,156,070; 4,159,365; 4,161,470; 4,169,933; 4,181,792; 4,183,895; 4,184,996; 4,188,476; 4,201,856; 4,219,461; 4,224,433; 4,226,970; 4,230,817; 4,232,143; 4,232,144; 4,238,598; 4,238,599; 4,238,600; 4,242;496; 4,245,082; 4,245,084; 4,247,514; 4,256,624; 4,265,802; 4,267,304; 4,269,965; 4,279,803; 4,299,756; 4,294,955; 4,337,190; 4,337,191; 4,318,841; and 4,355,134, which are herein incorporated by reference. The wholly aromatic polyesters are the preferred liquid crystal polymers to be used in the process of the present invention. As discussed hereafter, the wholly aromatic polyesters of U.S. Pat. Nos. 4,256,624; 4,161,470 and 4,184,996 are among those particularly preferred for use in the present invention.

Representative aromatic-aliphatic polyesters which exhibit thermotropic liquid crystalline properties are copolymers of polyethylene terephthalate and hydroxybenzoic acid as disclosed in Polyester X-7G *A Self Reinforced Thermoplastic*, by W. J. Jackson, Jr. H. F. Kuhfuss, and T. F. Gray, Jr., 30th Anniversary Technical Conference, 1975 Reinforced Plastic/Composites Institute, The Society of the Plastics Industry, Inc., Section 17-D, Pages 1-4. A further disclosure of such copolymers can be found in "Liquid Crystal Polymers: I. Preparation and Properties of p-Hydroxybenzoic Acid Copolymers," *Journal of Polymer Science, Polymer Chemistry Edition*, Vol. 14, pages 2043 to 2058 (1976), by W. J. Jackson, Jr. and H. F. Kuhfuss. See also U.S. Pat. Nos. 4,318,841 and 4,355,133, which are herein incorporated by reference.

Representative wholly aromatic and aromatic-aliphatic poly(ester-amides) which exhibit thermotropic liquid crystalline properties are disclosed in U.S. Pat. Nos. 4,272,625; 4,330,457; 4,351,917; 4,351,918; 4,341,688; 4,355,132; and 4,399,375, which are herein incorporated by reference. The poly(ester-amide) of U.S. Pat. No. 4,330,457 is particularly preferred for use in the present invention.

Representative aromatic polyazomethines which exhibit thermotropic liquid crystalline properties are disclosed in U.S. Pat. Nos. 3,493,522; 3,493,524; 3,503,739; 3,516,970; 3,516,971; 3,526,611; 4,048,148; and 4,122,070. Each of these patents is herein incorporated by reference in its entirety. Specific examples of such polymers include poly (nitrilo-2-methyl-1,4-phenylenenitriloethylidyne-1,4-phenyleneethylidyne); poly(nitrolo-2-methyl-1,4-phenylenenitrilo-methlidyne-1,4-phenylene-methylidyne); and poly(nitrilo-2-chloro-1,4-phenylenenitrilomethylidyne-1,4-phenylenemethylidyne).

Representative aromatic polyester-carbonates which exhibit thermotropic liquid crystalline properties are disclosed in U.S. Pat. Nos. 4,107,143, 4,284,757, and 4,371,660, which are herein incorporated by reference. Examples of such polymers include those consisting essentially of p-oxybenzoyl units, p-dioxyphenyl units, dioxycarbonyl units, and terephthoyl units.

The thermotropic liquid crystalline polymers selected for use in the extrusion process of the present invention generally need possess a melting temperature within the range that is amenable to melt extrusion while employing commercially available equipment. For instance, suitable thermotropic liquid crystalline polymers are those which exhibit a melting temperature somewhere within the range of approximately 260° to 400° C.

The thermotropic liquid crystalline polymers extruded in accordance with the present invention preferably also exhibit an inherent viscosity of at last 2.0 dl./g. when dissolved in a concentration of 0.1 percent by weight in pentafluorophenol at 60° C. (e.g. an inherent viscosity of approximately 2.0 to 15.0 dl./g.).

One of the particularly preferred wholly aromatic polyesters for extrusion in accordance with the present invention is that disclosed in U.S. Pat. No. 4,256,624, which polymer is capable of forming an anisotropic melt phase at a temperature below approximately 400° C. This polyester consists essentially of the recurring moieties I, II and III wherein:

II is a dioxyl aryl moiety of the formula ⁺O-Ar-O⁺ where Ar is a divalent radical comprising at least one aromatic ring, and is most preferably ; and III is a dicarboxy aryl moiety of the formula where Ar' is a divalent radical comprising at least one aromatic ring, and is most preferably

.

The polyester preferably comprises approximately 10 to 90 mole percent of moiety I, approximately 5 to 45 mole percent of moiety II and approximately 5 to 45 mole percent of moiety III. The polyester most preferably comprises approximately 20 to 80 mole percent of moiety I, approximately 10 to 40 mole percent of moiety II, and approximately 10 to 40 mole percent of moiety III. In addition, at least some of the hydrogen atoms present upon the rings optionally may be replaced by substitution selected from the group consisting of an alkyl group of 1 to 4 carbon atoms, an alkoxy group of 1 to 4 carbon atoms, halogen, phenyl, and mixtures thereof. This wholly aromatic polyester commonly exhibits an inherent viscosity of at least 2.5 dl./g., e.g., 3.5 to 7.5 dl./g., when dissolved in a concentration of 0.1 weight-/volume percent in pentafluorophenol at 60° C.

Another preferred wholly aromatic polyester is disclosed in U.S. Pat. No. 4,161,470, and is a melt processable wholly aromatic polyester capable of forming an anisotropic melt phase at a temperature below approximately 350° C. The polyester consists essentially of the recurring moieties I and II wherein:

, and

.

The polyester comprises approximately 10 to 90 mole percent of moiety I, and approximately 10 to 90 mole percent of moiety II. In one embodiment, moiety II can be present in a concentration of approximately 65 to 85 mole percent, and preferably in a concentration of approximately 70 to 80 mole percent, e.g., approximately 75 mole percent. In another embodiment, moiety II can be present in a lesser proportion of approximately 15 to 35 mole percent, and preferably in a concentration of approximately 20 to 30 mole percent.

The wholly aromatic polyester disclosed in U.S. Pat. No. 4,184,996 is also a preferred liquid crystal polyester for use in the present invention, and is a melt processable wholly aromatic polyester capable of forming an anisotropic melt phase at a temperature below approximately 325° C. The polyester consists essentially of the recurring moieties I, II and III wherein:

,

, and

.

The polyester generally comprises approximately 30 to 70 mole percent of moiety I. The polyester preferably comprises approximately 40 to 60 mole percent of moiety I, approximately 20 to 30 mole percent of moiety II, and approximately 20 to 30 mole percent of moiety III.

The poly(ester-amide) disclosed in U.S. Pat. No. 4,330,457 is also a preferred liquid crystal polyester. It is capable of forming an anisotropic melt phase at a temperature below approximately 400° C., and consists essentially of recurring moieties I, II, III, and optionally IV, wherein:

I is

II is $-\left[\begin{array}{c}O \\ \| \\ C-A-C \\ \| \\ O\end{array}\right]-$, where
A is a divalent radical comprising at least one aromatic ring or a divalent trans-1,4-cyclohexylene radical;

III is ${Y-Ar-Z}$ where Ar is a divalent radical comprising at least one aromatic ring, Y is O, NH, or NR, and Z is NH or NR, where R is an alkyl group of 1 to 6 carbon atoms or an aryl group; and IV is ${O-Ar'-O}$, where Ar' is a divalent radical comprising at least one aromatic ring.

At least some of the hydrogen atoms present upon the rings optionally may be replaced by substitution selected from the group consisting of an alkyl group of 1 to 4 carbon atoms, an alkoxy group of 1 to 4 carbon atoms, halogen, phenyl, and mixtures thereof. The poly(ester-amide) generally comprises approximately 10 to 90 mole percent of moiety I, approximately 5 to 45 mole percent of moiety II, approximately 5 to 45 mole percent of moiety III, and approximately 0 to 40 mole percent of moiety IV.

The foregoing preferred aromatic polyesters, and wholly aromatic polyesters in general which are suitable for use in the process of the present invention, may be formed by a variety of ester-forming techniques whereby organic monomer compounds possessing functional groups which upon condensation form the requisite recurring moieties are reacted. For instance, the functional groups of the organic monomer compounds may be carboxylic acid groups, hydroxyl groups, ester groups, acyloxy groups, acid halides, etc. The organic monomer compounds may be reacted in the absence of a heat exchange fluid via a melt acidolysis procedure. They, accordingly, may be heated initially to form a melt solution of the reactants with the reaction continuing as solid polymer particles suspended therein. A vacuum may be applied to facilitate removal of volatiles formed during the final stage of the condensation (e.g., acetic acid or water).

In commonly-assigned U.S. Pat. No. 4,083,829, entitled "Melt Processable Thermotropic Wholly Aromatic Polyester," is described a slurry polymerization process which may be employed to form the wholly aromatic polyesters which are preferred for use in the present invention. According to such a process, the solid product is suspended in a heat exchange medium. The disclosure of this patent has previously been incorporated herein by reference in its entirety.

When employing either the melt acidolysis procedure or the slurry procedure of U.S. Pat. No. 4,083,829, the organic monomer reactants from which the wholly aromatic polyesters are derived may be initially provided in a modified form whereby the usual hydroxy groups of such monomers are esterified (i.e., they are provided as lower acyl esters). The lower acyl groups preferably have from about two to about four carbon atoms. Preferably, the acetate esters of organic monomer reactants are provided.

Representative catalysts which optionally may be employed in either the melt acidolysis procedure or in the slurry procedure of U.S. Pat. No. 4,083,829 include dialkyl tin oxide (e.g., dibutyl tin oxide), diaryl tin oxide, titanium dioxide, antimony trioxide, alkoxy titanium silicates, titanium alkoxides, alkali and alkaline earth metal salts of carboxylic acids (e.g., zinc acetate), the gaseous acid catalysts, such as Lewis acids (e.g., $BF_3$), hydrogen halides (e.g., HCl), etc. The quantity of catalyst utilized typically is about 0.001 to 1 percent by weight based upon the total monomer weight, and most commonly about 0.01 to 0.2 percent by weight.

Besides the aforediscussed inherent viscosity, the wholly aromatic polyesters which are preferred for use in the present invention also commonly exhibit a weight average molecular weight of about 2,000 to 200,000, and preferably about 10,000 to 50,000, e.g., about 20,000 to 25,000. Such molecular weight may be determined by standard techniques not involving the solutioning of the polymer, e.g., by end group determination via infrared spectroscopy on compression molded films. Alternatively, light scattering techniques in a pentafluorophenol solution may be employed to determine the molecular weight.

The use of thermotropic liquid crystalline polymers is important to the process of the present invention. Such polymers do not exhibit any substantial elastic recoil upon exiting the extrusion die as do conventional polymers which are melt extruded. Polymers other than thermotropic liquid crystalline polymers are incapable of melt extrusion to form articles whose cross-sectional area accurately corresponds to the die shape, particularly when the land length is short.

According to the process of the present invention, therefore, a fluid stream of thermotropic liquid crystal polymer in the form of a liquid crystal polymer melt is provided to any conventional melt extrusion apparatus wherein the extrusion die is a short land or no land die having converging entry and is of a shape which corresponds to the cross-sectional configuration of the product to be formed. For example, the converging entry shape can be straight (e.g., cone-shaped or wedge-shaped) or curved (e.g., trumpet-shaped). Except for the foregoing requisites of the extrusion die, i.e., that it have a short land or no land and be of a size and shape corresponding to the desired final product, the particular apparatus used for extrusion is not critical to the operation of the process of the present invention. For example, one apparatus which has been found suitable for use with the thermotropic liquid crystal polymers employs a contact melting method so that the melt residence time can be kept short and constant. The apparatus includes a heated surface against which a molded rod of liquid crystal polymer is pressed. The fluid stream of molten polymer is then introduced to the extrusion chamber, inside of which is disposed a filter pack. The polymer melt is then extruded through an appropriate extrusion orifice. Examples of other suitable extrusion apparatus are described in *Plastics Engineering Handbook of the Society of the Plastics Industry, Inc.*, Fourth Edition, edited by Joel Frados, Von Nostrand Reinhold Company (1976), pp. 156-203.

As mentioned above, the extrusion die employed in the process of the present invention must be a short land or no land die. By short land it is meant that the land length is such that the ratio of the die land length (L) to die diameter (D) is less than 2. In the case of a complex die cross-section, D would be taken as the conventional or hydrodynamic diameter. In the case of sheet or film extrusion, D should be taken as the thickness of the die gap. When the land length is zero, i.e., a no land die is used, the ratio is zero. It is most preferred to employ a no land die as excellent results have been attained in using same.

Besides using a short land or no land die, the shape and size of the die extrusion orifice should be that of the desired end product. Many different profile shapes can be provided, with circular being preferred. Substantially no change is effected in the extruded profile upon exiting the die in the process of the present invention, and thus, the present invention offers the advantage of achieving an end product which corresponds to the size and shape of the die orifice. Since little if any distortion of the profile occurs upon exit of the die orifice, there is less chance of variations in the dimensions of the final product. Accordingly, the process allows one to consistently reproduce a product of desired size and shape. If desired, a sizing die could be added after the die, but before solidification.

The extruded profile undergoes little if no distortion since the drawdown which is effected is minimal. Typically, a drawdown is effected when liquid crystal polymers are extruded in order to orient the polymer molecules in the direction of the length of the article. Such orientation is generally considered important since it contributes to the mechanical properties of the product.

The amount of drawdown is generally expressed in terms of a drawdown ratio, which is defined as the ratio of the die cross-sectional area to that of the cross-sectional area of the fully solidified extrudate. Commonly, such drawdown ratios have heretofore been at least 10.

In the present invention, however, the drawdown ratio employed is less than 4, and is more preferably in the range of from 0.8 to 3, and most preferably in the range of from 1 to 2. With such limited drawdown, and the ability of the liquid crystal polymers to substantially avoid extrudate swell, the chance of variation in dimensions from extruded product to extruded product, and hence the reproducibility of the product, is far less with the present process than has heretofore been known. As well, the process of the present invention can also readily provide an article having cross-sectional dimensions which closely approximate those of the extrusion die.

Even though only minimal drawdown is employed in the process of the present invention, however, the final product produced still surprisingly exhibits extremely high mechanical properties. It is believed to be the use of a short land or no land die in combination with little or no drawdown which provides a product having not only dimensions which can closely approximate that of the die, but which also exhibits high mechanical properties. The recognition of having to use the short land or no land die in combination with minimal drawdown is fundamental to the present invention. In attempting to explain this phenomenon, it is believed that the removal of the land portion actually precludes disruptive shear deformation. Polymer melt streams generally experience high elongational field at the entry but only a shear field at the land. Thus, the liquid crystal molecules would be properly oriented at the entry region but may be disoriented at the land. By using a short land or no land die, however, the disorientation at the land portion is avoided. The need for drawdown to further orient the polymer molecules in the elongational direction is therefore reduced. Accordingly, a high mechanical property product is still attained.

As a result of the foregoing recognition, practice of the present process enables one to extrude a profile which substantially conforms to the die profile, thereby allowing for greater reproducibility and consistency in the product dimensions, while still maintaining, if not improving, high mechanical properties. For example, a product exhibiting at least 50 Ksi tensile strength and 4.5 Msi tensile modulus for a drawdown of about 1. Even in the case where some slight drawdown is achieved, the size reduction occurs without distortion of dimension ratios, thereby having the extruded profile closely approximate the relative die dimensions while maintaining such good properties. The process is therefore particularly applicable where a product needing exacting dimensions need be made consistently, for example, for use in industrial application. In connection therewith, a sizing die in addition to the extrusion die may be used when even further control of the dimensions is desired.

Moreover, it has surprisingly been found that much higher extrusion speeds can be utilized in the practice of the present invention for a given drawdown without sacrificing mechanical properties or consistency of dimensions. The ability to use higher extrusion speeds, of course, results in a more efficient and cost effective process.

Subsequent to the extrusion, and in addition to the minimal drawdown employed in the present process, appropriate cooling is applied to the extrudate of thermotropic liquid crystalline polymer intermediate the extrusion orifice and the point of collection. Appropriate fluid media, e.g., a gas or a liquid, may be selected to impart the desired cooling. For instance, the extrudate may be simply contacted by a stream of air or other gas or preferably immersed in a circulating bath of water or other liquid which is maintained at an appropriate temperature to impart the cooling required for solidification of the product. Generally, air cooling is sufficient for small extrudates, but liquid cooling may be necessary for large (e.g., greater than ¼ inch diameter) extrudates at high speeds.

The mechanical properties of shaped articles produced in accordance with the process of the present invention can be improved still further by subjecting the articles to a heat treatment following extrusion. The articles may be thermally treated in an inert atmosphere (e.g., nitrogen, argon, helium) or alternatively a flowing oxygen-containing atmosphere (e.g., air). For instance, the article may be brought to a temperature approximately 10° C. to 30° C. below the melting temperature of the liquid crystal polymer, at which temperature the article remains a solid object. The heat treatment times commonly range from a few minutes to a number of days, e.g., from 0.5 to 200 hours, or more. Preferably, the heat treatment is conducted for a time of 1 to 48 hours (e.g., approximately 24 to 30 hours). The heat treatment improves the properties of the article by increasing the molecular weight of the liquid crystalline polymer and increasing the degree of crystallinity.

The following Examples are given as specific illustrations of the invention. It should be understood, however, that the invention is not limited to the specific details set forth in the Examples. Reference is made in the Examples to the Drawing.

EXAMPLE 1

This example demonstrates the general increase in mechanical properties observed when a short land or no land die is used in the extrusion of liquid crystal polymers vis-a-vis a die having, for example, a one inch land die.

A thermotropic liquid crystal polymer comprised of 70 mole percent of 6-oxy-2-naphthoyl moiety and 15 mole percent terephthoyl moiety and 15 mole percent of dioxybenzoyl moiety having an inherent viscosity (I.V.) of 6.2 was extruded at a temperature above its melting point to make a circular strand under various extrusion conditions of extrusion speed using an Instron Capillary Rheometer. The extrusion was conducted at about 312° C. using 30 mil exit diameter circular dies with 90° full entrace angle for both a die having no land portion and a die having a one inch land portion. Subsequent to extrusion, the strands were allowed to fall down in quiescent air at room temperature. The drawdown ratio ranged approximately from 0.8 to 1.3.

The final strand properties of tensile strength (T.S.), elongation (El.) and initial modulus (I.M.), as well as the diameter of the circular strands were measured. The mechanical properties were measured according to standard ASTM testing procedure D3822. The results are tabulated in Table I.

TABLE I

| | Extrusion Conditions | | | Strand Properties | | |
|---|---|---|---|---|---|---|
| | Extrusion | | | | | |
| Sample Number | Speed (cm/min.) | Force (kg) | Pressure (psi) | Diameter (mils) | Drawdown Ratio | T.S./El./I.M. (Ksi)/(%)/(Msi) |
| | | | NO LAND DIE | | | |
| 1 | 6.25 | 0.3 | 6.0 | 28.5 | 1.11 | 68.3/1.41/5.79 |
| 2 | 18.8 | 0.5 | 10 | 27.9 | 1.16 | 80.5/1.31/7.12 |
| 3 | 62.5 | 1.6 | 32 | 30.0 | 1.00 | 67.3/1.36/5.84 |
| 4 | 188 | 4.6 | 92 | 33.8 | 0.788 | 37.8/1.78/3.78 |
| 5 | 625 | 11 | 220 | 33.7 | 0.792 | 35.0/1.20/3.28 |
| | | | 1 INCH LAND DIE | | | |
| 6 | 6.25 | 6.0 | 120 | 26.7 | 1.26 | 35.4/1.00/4.17 |
| 7 | 18.8 | 11.5 | 230 | 27.2 | 1.22 | 44.3/1.24/4.45 |
| 8 | 62.5 | 22.4 | 447 | 28.4 | 1.12 | 37.1/1.30/3.49 |
| 9 | 188 | 78 | 1560 | 28.7 | 1.09 | 38.3/1.22/3.73 |
| 10 | 625 | 130 | 2600 | 27.9 | 1.16 | 32.9/1.10/3.49 |

As evident from Table I, the extrusion speed for 1 inch land die is limited to approximately 625 cm/min. since the extrusion pressure generally should not exceed 3,000 psi. However, the use of a no land die results in greatly reduced pressure (an order of magnitude lower) at the same extrusion speed. Thus much higher extrusion rates are possible by using a no land die. In addition, as can be seen from Table I, the use of a no land die results in a product having improved mechanical properties at extrusion speeds of less than 188 cm/sec., and particularly of 62.5 cm/min. At higher extrusion speeds, the mechanical properties were comparable to those of the strands obtained by using a one inch land die. This is caused by a small extrudate swell at high extrusion rates as indicated by the strand diameter. When an appropriate take up or haul-off device is employed, the extrudate swell can be eliminated and the drawdown ratio can be kept constant. When the drawdown ratio, however, is kept at a constant level below 4 as per the present invention, the mechanical properties are found to be independent of the extrusion speed as shown in the following example (Example 2). In other words, at a given drawdown ratio, the mechanical properties will be the same irrespective of the extrusion speed. Thus, a valid comparison between strand 2 and strand 10 can be made since the drawdown ratio is the same. This comparison clearly demonstrates the advantage of using the no land die over the one inch land die. This, as well as the advantageous high mechanical properties possible through the practice of the present invention, are demonstrated in the next example.

EXAMPLE 2

The same polymer employed in Example 1 was extruded using the same procedure as in Example 1. Strands were produced at various draw ratios employing a haul-off device for extrusion speeds of both 31.3 cm/min. and 313 cm/min. The final strand properties of tensile strength and initial modulus were determined as in Example 1. The results are tabulated below.

TABLE II

| Extrusion Speed (cm/min.) | Drawdown Ratio | Diameter (mils) | T.S./El./I.M. (Ksi)/(%)/(Msi) |
|---|---|---|---|
| 31.3 | 1.12 | 28.4 | 84.2/1.67/6.73 |
| 31.3 | 1.36 | 25.7 | 111/1.55/8.89 |
| 31.3 | 2.10 | 20.7 | 136/1.6/10.4 |
| 313 | .79 | 34.7 | 46.0/1.46/3.96 |
| 313 | 1.21 | 27.3 | 95.1/1.74/6.82 |
| 313 | 1.28 | 26.5 | 109/1.60/8.35 |

Figure 1:
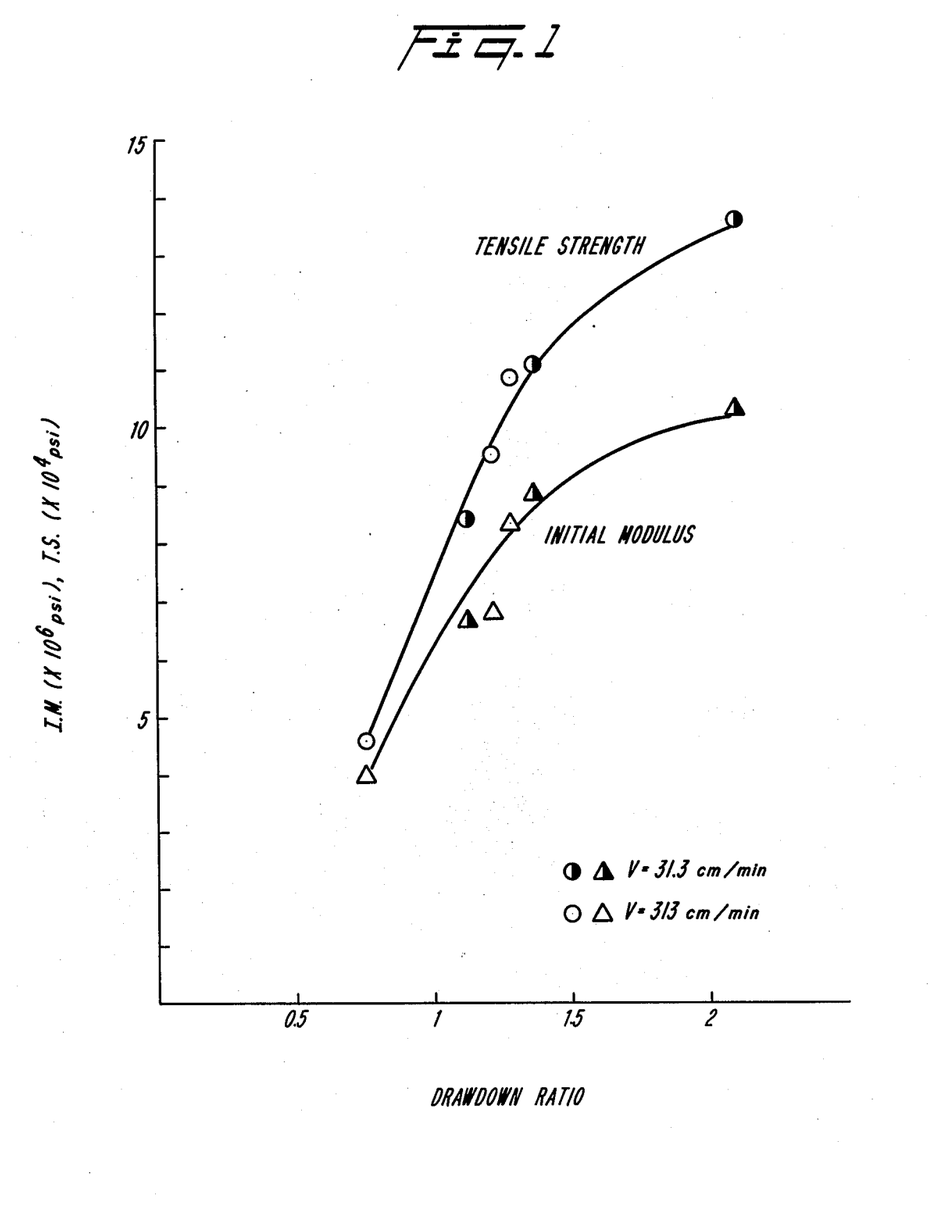
FIG. 1 is a graphic representation of tensile strength and initial modulus vs. drawdown ratio for an extrudate made via the process of the present invention at different extrusion rates.

The tabulated results of tensile strength and initial modulus are graphically depicted in FIG. 1. As can be seen therefrom, the mechanical properties are generally independent of the extrusion speed for a given drawdown ratio. Therefore, in the practice of the present invention, one can successfully utilize high extrusion speeds to achieve articles exhibiting improved mechanical properties by simply maintaining the drawdown ratio upon using appropriate take-up or haul-off devices.

Figure 2:
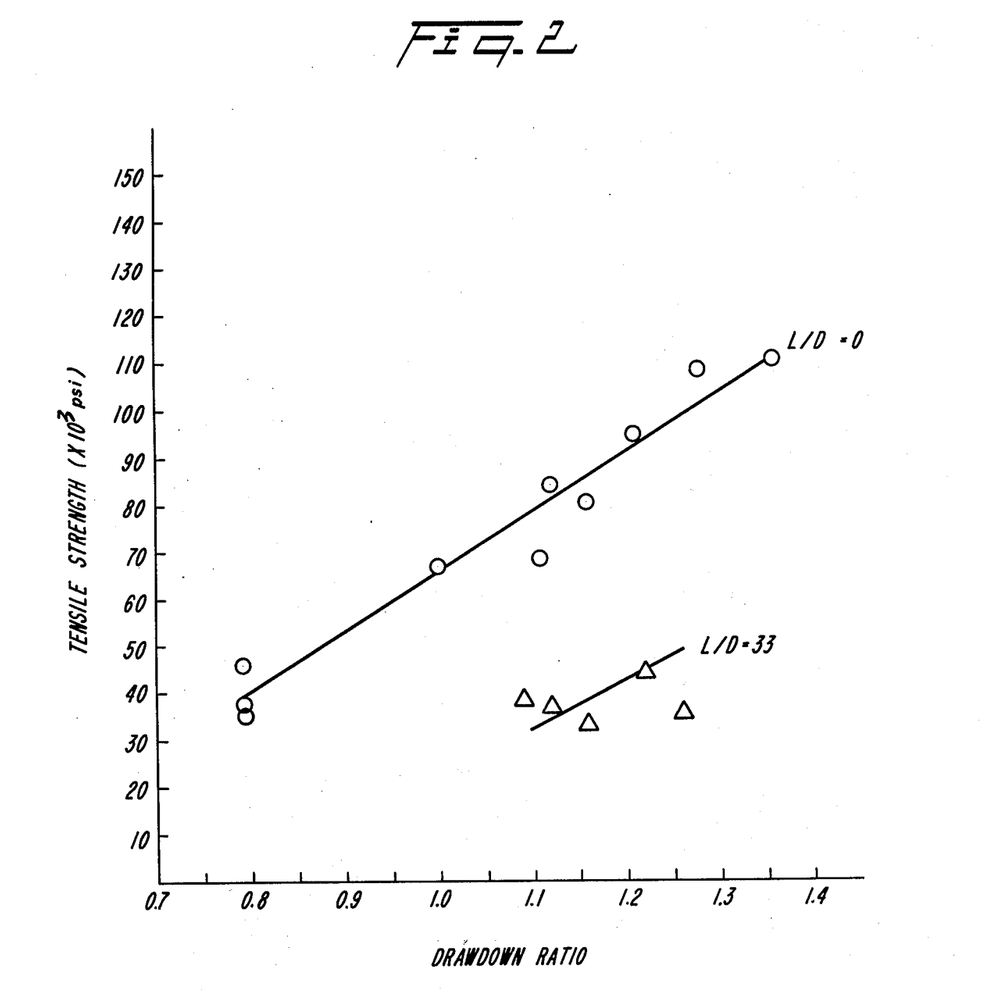
FIG. 2 is a graphic representation of tensile strength vs. drawdown ratio for extruded strands produced under various extrusion speeds with a no land die and a one inch land die.
Figure 3:
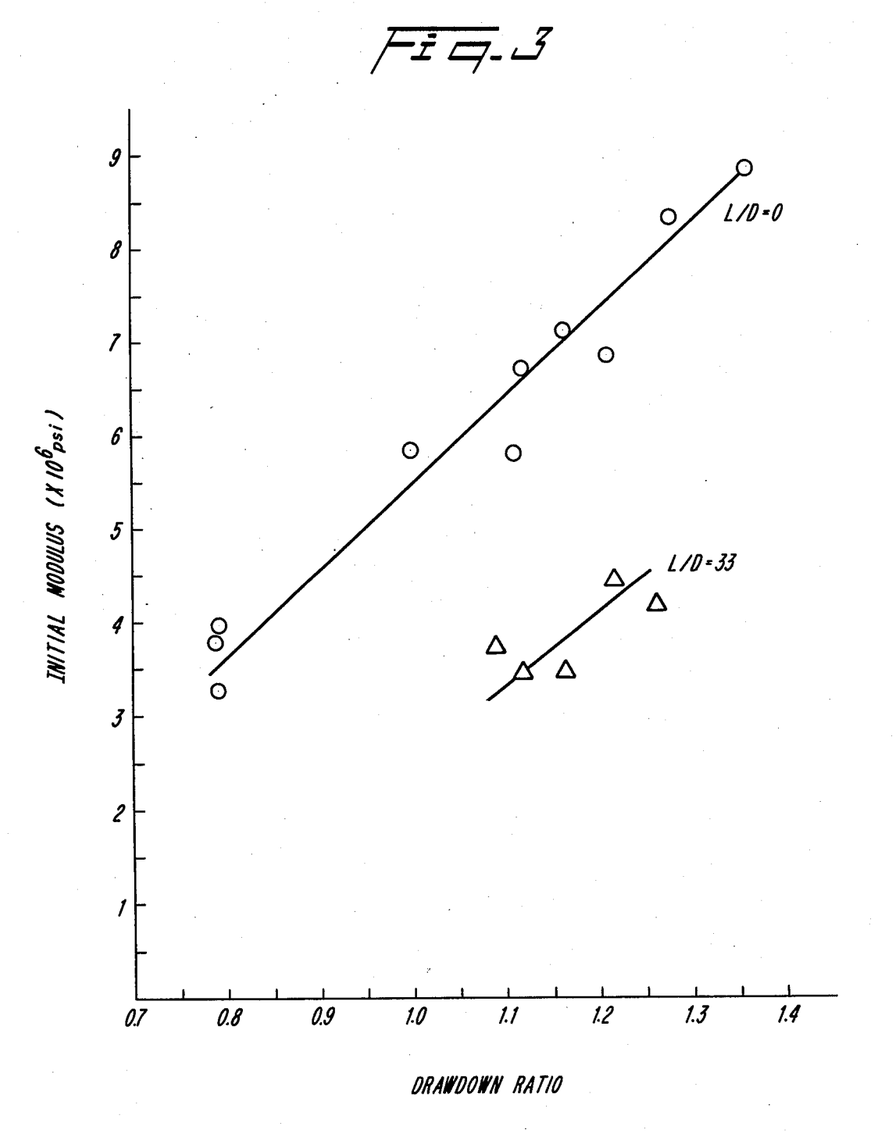
FIG. 3 is a graphic representation of initial modulus vs. drawdown ratio for extruded strands produced under various extrusion speeds with a no land die and a one inch land die.

The mechanical properties of the strands produced using a no land die (L/D=0) and a one inch land die (L/D=33) at various extrusion rates described in Example 1 and Example 2 are graphically contrasted in FIG. 2 for tensile strength and FIG. 3 for initial modulus as a function of drawdown ratio. It is seen that the mechanical properties of strands produced with a no land die is significantly superior to those of circular strands produced with a one inch die.

The foregoing results also demonstrate the excellent mechanical properties one can achieve via the present invention when such minimal drawdown is utilized so that the cross-sectional dimensions of the extruded profile closely approximate those of the extrusion die. This is possible for thermotropic liquid crystalline polymers since extrudate swell is significantly smaller than conventional flexible chain polymers. For example, at a drawdown ratio of only 1.12, a product having a tensile strength of 84.2 Ksi and an initial modulus of 6.73 Msi was obtained in the practice of the present invention. Thereby, the present invention can be advantageously and surprisingly used to prepare a product having substantially the cross-sectional dimensions of the extrusion orifice without having to sacrifice high mechanical properties. As well, the process can be run at higher extrusion speeds.

EXAMPLE 3

A thermotropic liquid crystal polymer comprised of 60 mole percent 6-oxy-2-naphthoyl moiety and 20 mole percent terephthoyl moiety and 20 mole percent dioxybenzoyl moiety having an inherent viscosity of 5.6 was extruded at a temperature above its melting point, i.e., 300° C., with the same dies and the same equipment as Example 1. The extrusion speed was kept constant at 313 cm/min. for both dies. The pressure required to sustain this extrusion speed was 60 psi for the die having no land but was 1080 psi for the die having a one inch die. The extrudate was drawn down at several ratios using a haul-off device and the mechanical properties were determined according to ASTM D3822. The results are tabulated in Table III below.

TABLE III

| Extrusion Conditions Drawdown Ratio | Strand Properties Diameter (mils) | T.S./El./I.M. (Ksi)/(%)/(Msi) |
|---|---|---|
| NO LAND DIE | | |
| 0.98 | 30.7 | 52.7/1.32/4.23 |
| 1.08 | 29.2 | 60.2/1.36/5.21 |
| 1.71 | 23.2 | 68.9/1.20/6.38 |
| 2.78 | 18.2 | 71.1/1.00/7.92 |
| 4.00 | 15.1 | 84.0/1.13/8.19 |
| 1 INCH LAND DIE | | |
| 1.54 | 24.4 | 40.3/1.23/4.07 |
| 1.83 | 22.4 | 48.7/1.33/4.73 |
| 2.10 | 20.9 | 59.1/1.47/5.11 |
| 2.56 | 18.9 | 64.7/1.28/6.15 |
| 2.72 | 18.4 | 60.6/1.06/6.52 |
| 5.48 | 12.9 | 87.1/1.11/9.19 |

Figure 4:
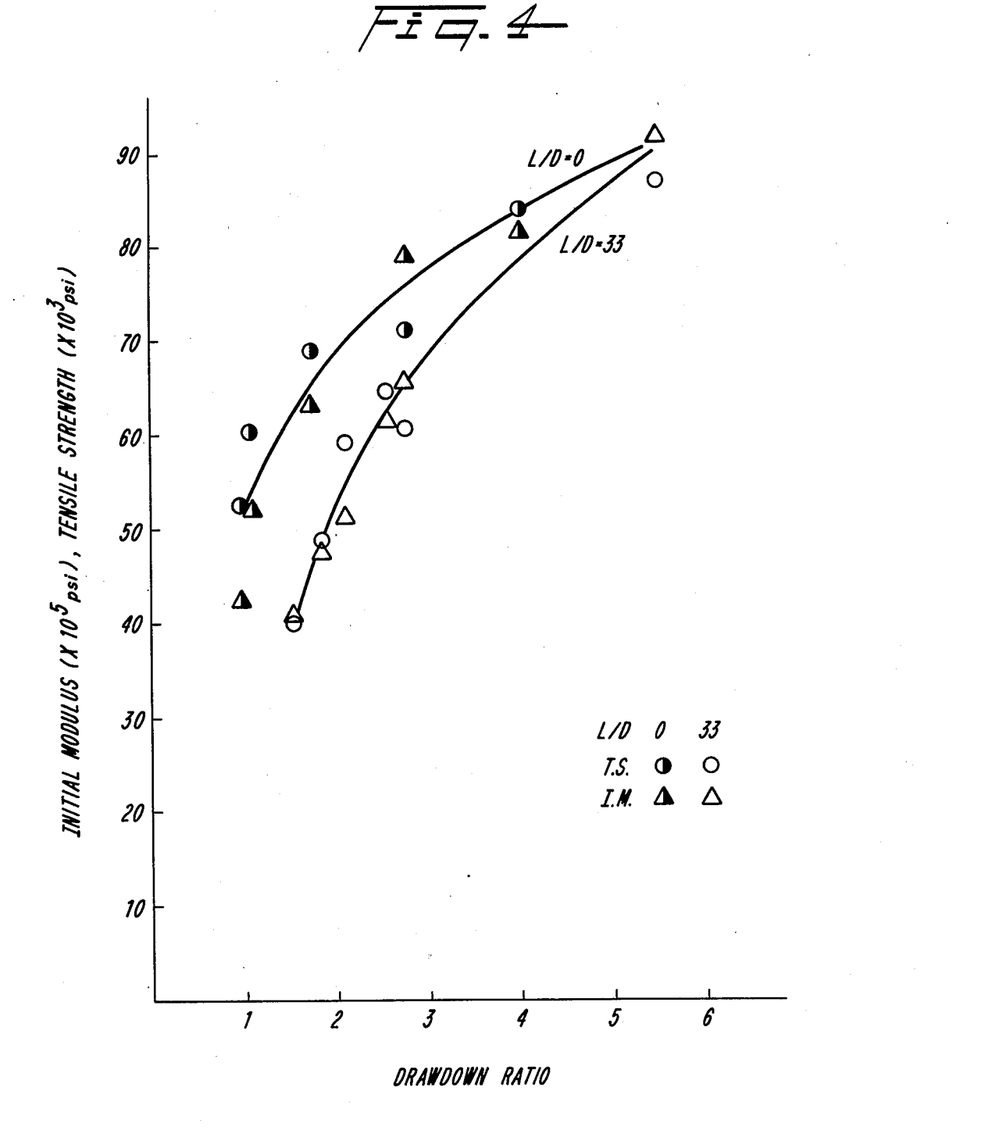
FIG. 4 is a graphic representation of tensile strength and initial modulus of extruded strands produced with different drawdown ratios using a no land die and a one inch land die.

The tensile strength and modulus are graphically depicted as a function of drawdown ratio in FIG. 4. It is readily seen therefrom that the use of a no land die gives higher mechanical properties than the one inch die for a given drawdown ratio below 4.

EXAMPLE 4

A well dried thermotropic liquid crystalline polymer comprised of 27 mole percent of a 6-oxy-2-naphthoyl moiety and 73 mole percent of a p-oxybenzoyl moiety having a melting point of 280 ° C. and an I.V. of 5.4 was extruded at 310° C. through a sand pack and 325 mesh screen using an apparatus employing a contact melting method. The extrusion was conducted using a 5 mil diameter circular die having 60° full entrance angle for both a die having a no land portion (L/D=0) and a die having a 6.26 mil land portion (L/D=1.25). The strands were extruded vertically downward in quiescent air at room temperature at several extrusion speeds. The properties of the strands were measured in the same manner as Example 1. The results are tabulated in Table IV below.

TABLE IV

| Extrusion Conditions | | | Strand Properties | |
|---|---|---|---|---|
| Extrusion Speed (m/min.) | Pressure (psi) | Drawdown Ratio (—) | Diameter (mils) | T.S./El./I.M. (Ksi)/(%)/(Msi) |
| NO LAND DIE (L/D = 0) | | | | |
| 8.5 | 630 | 1.33 | 4.32 | 149/3.11/6.27 |
| 17 | 1040 | 1.23 | 4.51 | 129/3.04/5.47 |
| 25.5 | 1390 | 1.13 | 4.70 | 109/3.10/4.59 |
| 6.26 mil LAND DIE (L/D = 1.25) | | | | |
| 8.5 | 700 | 1.44 | 4.17 | 143/3.27/5.90 |
| 17 | 1190 | 1.27 | 4.43 | 117/3.35/4.68 |
| 25.5 | 1540 | 1.22 | 4.53 | 109/3.51/4.25 |

Figure 5:
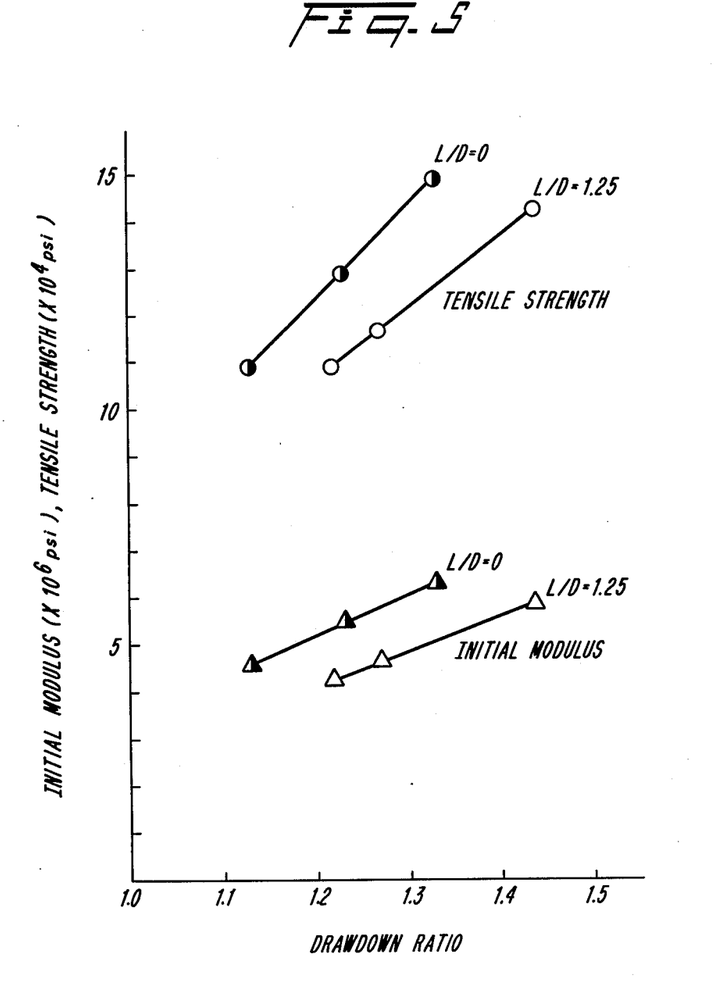
FIG. 5 is a graphic representation of tensile strength and initial modulus vs. drawdown ratio for extrudates made via processes using a no land die and a 6.26 mil land die.

The mechanical properties are plotted against the drawdown ratio in FIG. 5. While good mechanical properties are achieved while using the 6.26 mil land die, the distinct advantage, and hence preference, of using a no land die is clearly seen from the figure.

EXAMPLE 5

A well dried thermotropic liquid crystalline polymer comprised of 60 mole percent of a 6-oxy-2-naphthoyl moiety, 20 mole percent of a terephthoyl moiety, and 20 mole percent of a pamino phenol moiety having a melting point of 280° C. and an I.V. of 4.14 was extruded at 340° C. following the same procedure as in Example 4. The extrusion was conducted using a 3 mil diameter circular die having 60° full entrance angle for both a no land portion (L/D=0) and a die having a 7.52 mil land portion (L/D=2.5). Employing the same extrusion and testing procedure as in Example 4, the results are tabulated in Table V below.

TABLE V

| Extrusion Conditions | | | Strand Properties | |
|---|---|---|---|---|
| Extrusion Speed (m/min.) | Pressure (psi) | Drawdown Ratio (—) | Diameter (mils) | T.S./El./I.M. (Ksi)/(%)/(Msi) |
| NO LAND DIE (L/D = 0) | | | | |
| 23.6 | 1600 | 1.14 | 2.81 | 65.6/2.47/3.44 |
| 47.2 | 3450 | 0.96 | 3.06 | 44.8/2.46/2.31 |
| 70.8 | 5250 | 0.85 | 3.25 | 26.0/2.05/1.52 |
| 7.52 mil LAND DIE (L/D = 2.5) | | | | |
| 23.6 | 2450 | 1.17 | 2.77 | 54.5/2.28/3.19 |
| 47.2 | 4650 | 1.03 | 2.96 | 42.5/2.43/2.37 |
| 70.8 | 6000 | 0.85 | 3.25 | 14.9/1.57/1.02 |

Figure 6:
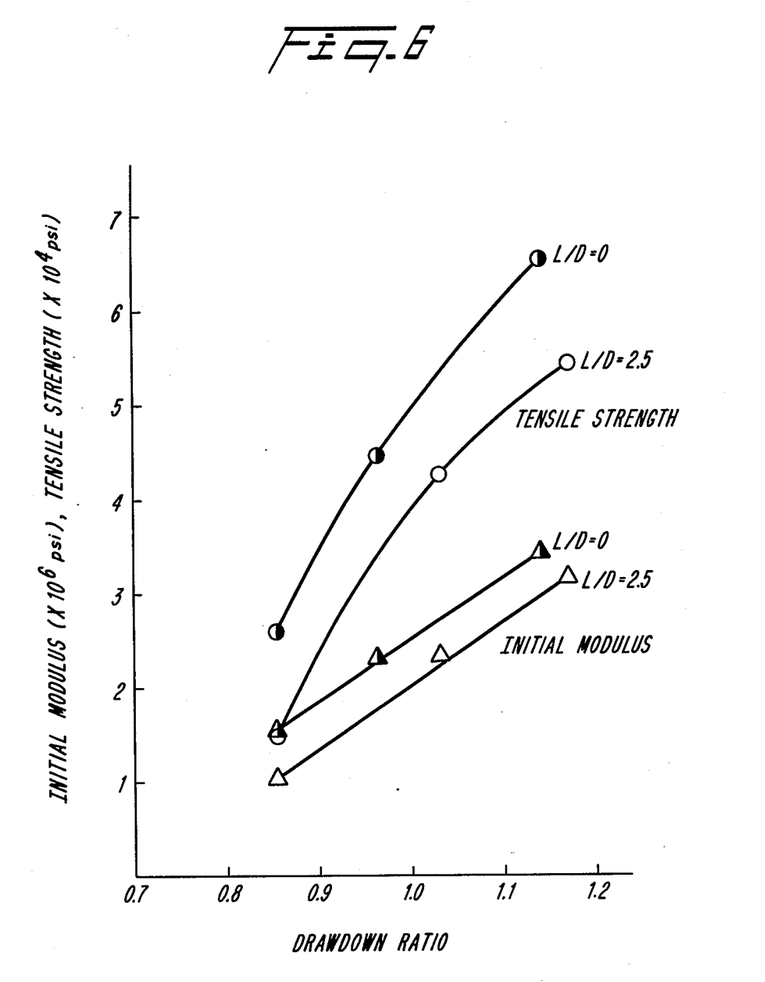
FIG. 6 is a graphic representation of tensile strength and initial modulus vs. drawdown ratio for extrudates made via processes using a no land die and a 7.52 mil land die.

It is seen that the pressure requirement is very high to extrude the polymer through sand pack, screen, and small orifice at such high extrusion speeds. In this kind of situation, the use of no land die helps by lowering the pressure as seen in the table. In fact, the extrusion speed of 70.8 m/min. for using a 7.52 mil die could not be sustained since the pressure kept rising and the extrusion was stopped when the pressure reached about 6000 psi. The tensile strength and the initial modulus of strands produced using both types of dies were plotted against drawdown ratio in FIG. 6. The distinct advantage of a no land die in obtaining higher mechanical properties is clearly demonstrated.

Although the invention has been described with preferred embodiments, it is to be understood that variations and modifications may be employed as will be apparent to those skilled in the art. Such variations and modifications are to be considered within the purview and the scope of the claims appended hereto.

What is claimed is:

1. A process for extruding a polymer to form shaped articles comprising the steps of:
   (a) providing thermotropic liquid crystal polymer in melt form,
   (b) extruding said liquid crystal polymer through an extrusion die having a converging entry section and a land length such that the ratio of land length (L) to die orifice diameter (D) is less than 2, and
   (c) subjecting the extrudate to a drawdown using a haul-off or take-up device such that the drawdown ratio is less than 4.

2. The process of claim 1, wherein the cross-sectional dimensions of the shaped article are substantially the same as that of the extrusion die orifice used in extruding the article.

3. The process of claim 1, wherein the drawdown ratio is in the range of from about 0.8 to 3.

4. The process of claim 1, wherein the drawdown ratio is in the range of from about 1 to 2.

5. The process of claim 1, wherein the ratio L/D is zero.

6. The process of claim 1, wherein the drawdown ratio is about 1.

7. The process of claim 1, wherein the liquid crystalline polymer is a wholly aromatic polyester.

8. The process of claim 1, wherein the liquid crystalline polymer includes not less than about 10 mole percent of recurring units which include a naphthalene moiety.

9. The process of claim 8, wherein the wholly aromatic polyester includes not less than about 10 mole percent of recurring units which include a naphthalene moiety.

10. The process of claim 9, wherein the naphthalene moiety is a 6-oxy-2-naphthoyl moiety, 2,6-dioxynaphthalene moiety or 2,6-dicarboxynaphthalene moiety.

11. The process of claim 10, wherein the naphthalene moiety is a 6-oxy-2-naphthoyl moiety.

12. The process of claim 1, wherein the thermotropic liquid crystal polymer is a wholly aromatic polyester, aromaticaliphatic polyester, wholly aromatic poly(ester-amide), aromaticaliphatic poly(ester-amide), aromatic polyazomethine, aromatic polyester-carbonate or mixture thereof.

13. The process of claim 1, wherein the thermotropic liquid crystal polymer is an aromatic poly(ester-amide).

14. The process for extruding a polymer to form shaped articles comprising the steps of:
   (a) providing thermotropic liquid crystal polymer in melt form,
   (b) extruding said liquid crystal polymer through an extrusion die having a converging entry section and substantially no land portion so that the ratio of land length (L) to die orifice diameter (D) is about zero, and
   (c) subjecting the extrudate to a drawdown such that the drawdown ratio is in the range of from about 1 to 2.

15. The process of claim 14, wherein the liquid crystal polymer includes recurring units of a 6-oxy-2-naphthoyl moiety.

16. A process for extruding a polymer to form a shaped article having high mechanical properties and substantially the same cross-sectional dimensions as a die orifice used to extrude the article, said process comprising
   (a) providing thermotropic liquid crystal polymer in melt form,
   (b) extruding said liquid crystal polymer through an extrusion die which has substantially no land portion, and
   (c) subjecting the extrudate to a drawdown such that the drawdown ratio is about 1.

17. The process of claim 16, wherein the liquid crystal polymer includes recurring units of a 6-oxy-2-naphthoyl moiety.

* * * * *